US012718661B1

(12) United States Patent
Crawford et al.

(10) Patent No.: US 12,718,661 B1
(45) Date of Patent: Aug. 25, 2026

(54) SYSTEM AND METHOD FOR REPLAYING ELECTRONIC GAMING MACHINE GAME PLAYS AND RESULTS

(71) Applicant: Rogue Gaming Studio, Reno, NV (US)

(72) Inventors: Patrick Crawford, Reno, NV (US); Matthew Oaks, Reno, NV (US); Bradly Schultz, Reno, NV (US); David McWilliams, Reno, NV (US); Brandon Hendrix, Reno, NV (US)

( * ) Notice: Subject to any disclaimer, the term of this patent is extended or adjusted under 35 U.S.C. 154(b) by 0 days.

(21) Appl. No.: 19/347,591

(22) Filed: Oct. 1, 2025

Related U.S. Application Data

(60) Provisional application No. 63/816,299, filed on Jun. 2, 2025.

(51) Int. Cl.
*G07F 17/32* (2006.01)

(52) U.S. Cl.
CPC ................................ *G07F 17/3246* (2013.01)

(58) Field of Classification Search
CPC ............................. G06F 17/3246; G06F 17/32
USPC ........................................................... 463/25
See application file for complete search history.

(56) References Cited

U.S. PATENT DOCUMENTS

| | | | | |
|---|---|---|---|---|
| 6,699,127 B1 * | 3/2004 | Lobb | A63F 13/45 | 463/43 |
| 11,928,931 B2 | 3/2024 | Coppoloa et al. | | |
| 2002/0196342 A1 | 12/2002 | Walker et al. | | |
| 2004/0147314 A1 | 7/2004 | LeMay et al. | | |
| 2008/0146323 A1 * | 6/2008 | Hardy | G07F 17/3255 | 463/25 |
| 2009/0054148 A1 * | 2/2009 | Hardy | G07F 17/3244 | 463/43 |
| 2009/0191962 A1 * | 7/2009 | Hardy | G07F 17/3239 | 463/29 |
| 2010/0029376 A1 * | 2/2010 | Hardy | G07F 17/32 | 463/25 |

FOREIGN PATENT DOCUMENTS

AU 2012268850 B2 7/2013

* cited by examiner

*Primary Examiner* — Pierre E Elisca
(74) *Attorney, Agent, or Firm* — FisherBroyles, LLP; Rob L. Phillips

(57) ABSTRACT

A system and method for allowing players to replay certain EGM game plays. EGM game plays resulting in a threshold payout or strength can be optionally replayed by the player. The replay may be free or fee-based. A replay module installed in the EGM or in communication with a processor driving the EGM retrieves the replays from EGM memory. The replay may be shown on an EGM display or transmitted to a mobile device. The replay may also be recreations based on metadata. An accounting system is also utilized to record replay usage and earned revenue.

24 Claims, 7 Drawing Sheets

SYSTEM AND METHOD FOR REPLAYING ELECTRONIC GAMING MACHINE GAME PLAYS AND RESULTS

This application claims priority to U.S. Patent Application No. 63/816,299 filed Jun. 2, 2025, which is incorporated herein by reference for all purposes.

FIELD OF THE INVENTION

The embodiments of the present invention relate to electronic gaming machines and a system and method allowing game plays and outcomes of the electronic gaming machines to be replayed.

BACKGROUND

Casinos derive much of their gaming revenue from electronic gaming machines ("EGMs") including but not limited to slot machines, video poker machines and keno machines Indeed, EGMs occupy a large percentage of any casino floor.

EGMs have become increasingly sophisticated, featuring enhanced graphical displays and more interactive gaming experiences. However, after a game round concludes, players have no means of reviewing the actual play sequence or outcome, leaving some uncertainty regarding the result or simply diminishing the entertainment experience.

One item missing from EGMs is the ability for a player to replay certain game plays resulting in certain outcomes. For example, if a player hits a jackpot, the player can only memorialize the outcome. That is, players often take photos of the jackpot to show others. The outcome by itself is somewhat anti-climactic for those observing it.

There exists a need for a system and method allowing players to request and view an instant replay of a game result, whether in real time or slow motion, thus enhancing transparency, entertainment value, and player satisfaction. Further, there is a need for a system that provides the ability to offer and process an optional replay feature as a purchasable service within the gaming experience, wherein any such purchase may be conveniently and securely debited from the player's displayed credit or cash meter.

Accordingly, the system and method detailed herein involve allowing the player to replay the entire game play where the result meets a pre-established threshold. This allows the player and others to experience the anticipation and thrill of the actual game play that resulted in the jackpot or other outcome.

SUMMARY

The embodiments of the present invention relate to an instant replay system and method for gambling games. Upon the conclusion of a game round, such as a slot machine spin, the system stores the game result, including graphical and event data. Upon a player request, an instant replay of the game is generated and displayed, replicating the play sequence in real time or slow motion as selected. The embodiments of the present invention are adaptable to both traditional slot machine cabinets and virtual online gaming platforms.

In one embodiment, the instant replay feature is offered as a purchasable service. Upon completion of a game round, the gaming operating system automatically prompts the player with an option to purchase the instant replay feature. If the player accepts and completes the purchase, the instant replay is displayed as described. The system processes the purchase by deducting the replay fee directly from the player's credit or cash meter as displayed by the gaming operating system, ensuring seamless integration into normal wager accounting. The instant replay feature is tightly integrated with the gaming operating system, enabling robust, secure, and authentic replays according to the original round's events, and optionally monetizing this enhanced experience for the operator.

One system embodiment of the present invention includes a monetary input device configured to receive a physical item associated with a monetary value; a user interface configured to: enable a player to select a wager for a game of chance and enable the player to initiate a cash out operation; at least one processor running executable instructions related to a game of chance; said at least one processor programmed to: add said monetary value to a credit balance for said player; deduct said selected wager from said credit balance; and decrease said credit balance in response to said cash out operation; at least one game display; memory in communication with said at least one processor; and wherein said at least one processor runs said executable instructions to: (i) generate and present a game play on said at least one game display resulting in a random game play outcome and (ii) responsive to an input via said user interface, replay on said at least one game display said game play resulting in said random game play outcome.

One method embodiment of the present invention includes receiving a physical item associated with a monetary value; configuring a user interface to: enable a player to select a wager for a game of chance and enable the player to initiate a cash out operation; running executable instructions related to a game of chance on at least one processor; said executable instructions for at least adding said monetary value to a credit balance for said player; deducting said selected wager from said credit balance; and decreasing said credit balance in response to said cash out operation; providing memory in communication with said at least one processor; and wherein said executable instructions further for at least (i) generating and presenting a game play on at least one game display resulting in a random game play outcome and (ii) responsive to an input via said user interface, replaying on said at least one game display said game play resulting in said random game play outcome.

Depending on the embodiment, the replay may be free or fee-based. In one embodiment, the speed of the replay can be selected by the player. Speeds can include standard, slow motion and super slow motion. The player can then use a mobile device to capture the replay. Alternatively, the replay may be transmitted and played on a mobile device (e.g., smartphone).

Those skilled in the art will recognize that the system and method detailed herein can be used with standalone EGMs, countertop EGMs, server-based games of chance and online games of chance.

Other variations, embodiments and features of the present invention will become evident from the following detailed description, drawings and claims.

BRIEF DESCRIPTION OF THE DRA WINGS

DETAILED DESCRIPTION

Figure 1:
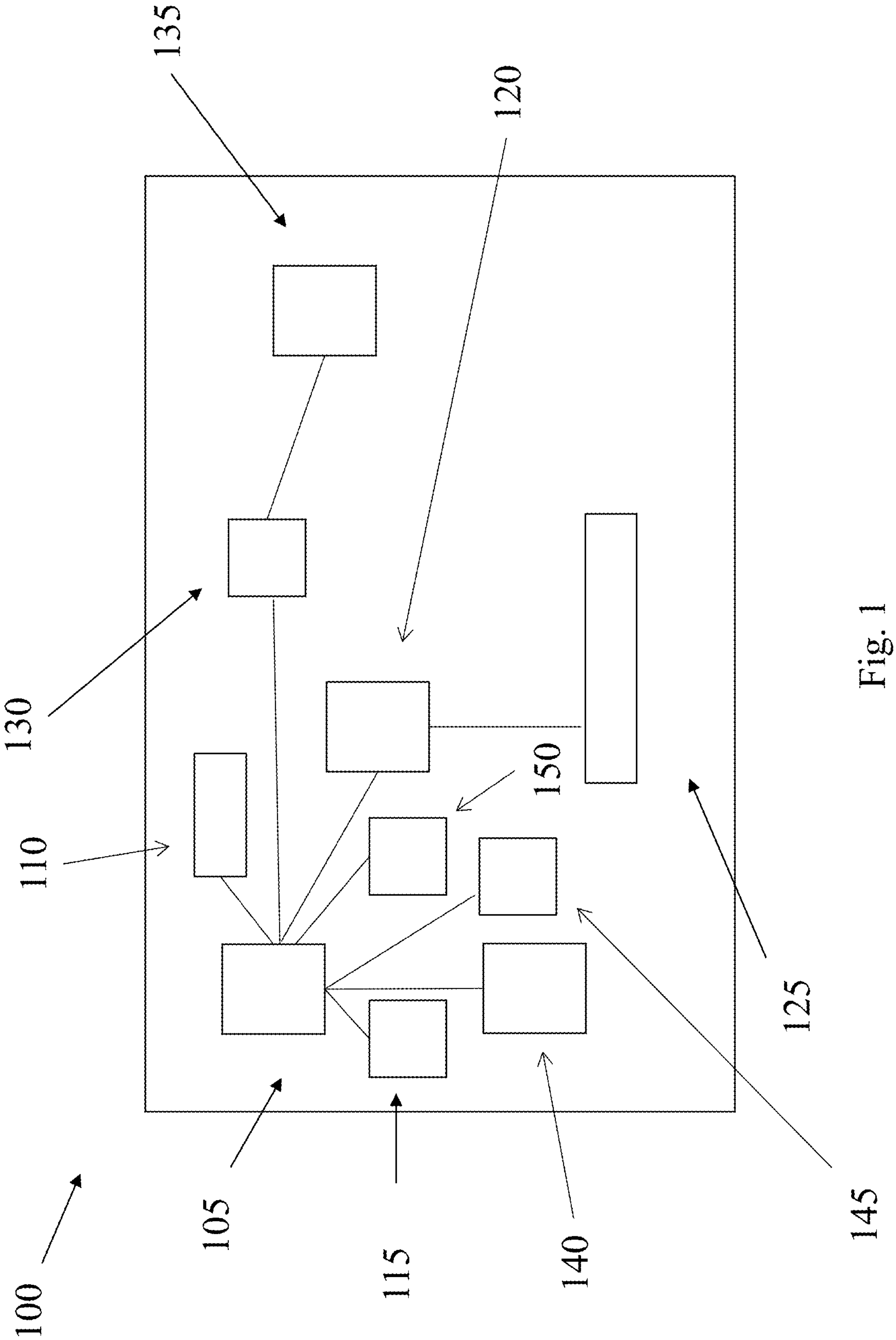
FIG. 1 illustrates a block diagram of a multiple casino property system of the type that may be used to facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements, which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wired, wireless, wireline, optical fiber cable, RF, Bluetooth and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

Those skilled in the art will recognize that certain types of EGMs, generally utilized in regulated casino environments, are still commonly referred to as "slot machines." Although the etymology of the term "slot machine" was originally derived from a coin slot in the gaming machines at the time, coin slots have long since generally been replaced by payment input devices or bill validators which only accept paper currency or ticket-in-ticket-out vouchers and/or electronic fund transfer means, such as card readers, mobile device payment means or account interfaces. As a result, the term EGM and slot machine are used interchangeably and are defined to mean something different than a laptop or desktop computer, cell phones, tablet computer gaming devices and the like.

The embodiments of the present invention may be facilitated by an electronic gaming device whereby a single player plays against the electronic gaming device's (or machine's) processor as described herein. The electronic gaming device may be a standalone device and bar-top device forming part of a gaming device network or not. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming device 100 may be linked to a central game server which allows players to select from a number of games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. Payout system 150 includes a coupon printer or similar device for receiving money/coupon from the electronic gaming device 100.

Those skilled in the art will recognize that the configuration and features of the electronic gaming device 100 disclosed herein are exemplary and may be altered in any number of ways without impacting the embodiments of the present invention.

Figure 2:
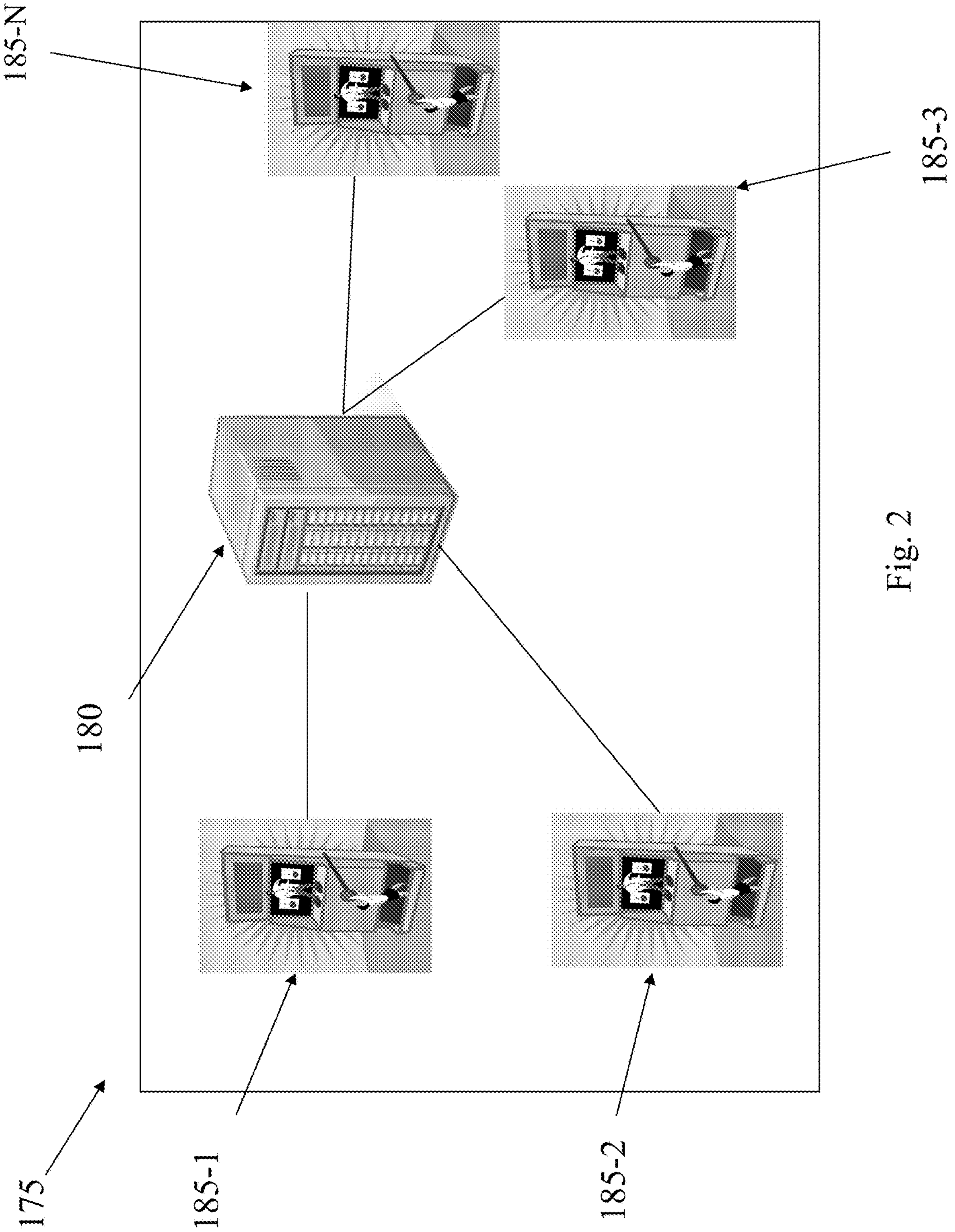
FIG. 2 illustrates a block diagram of a wireless network system of the type that may be used to facilitate the embodiments of the present invention.

FIG. 2 shows a block diagram of a gaming network 175 which may be used to facilitate play of the game via linked gaming devices according to the embodiments of the present invention. The gaming network 175 comprises a central processor 180 (e.g., processor-equipped game server) in communication with multiple gaming devices 185-1 through 185-N as described in FIG. 1.

Figure 3:
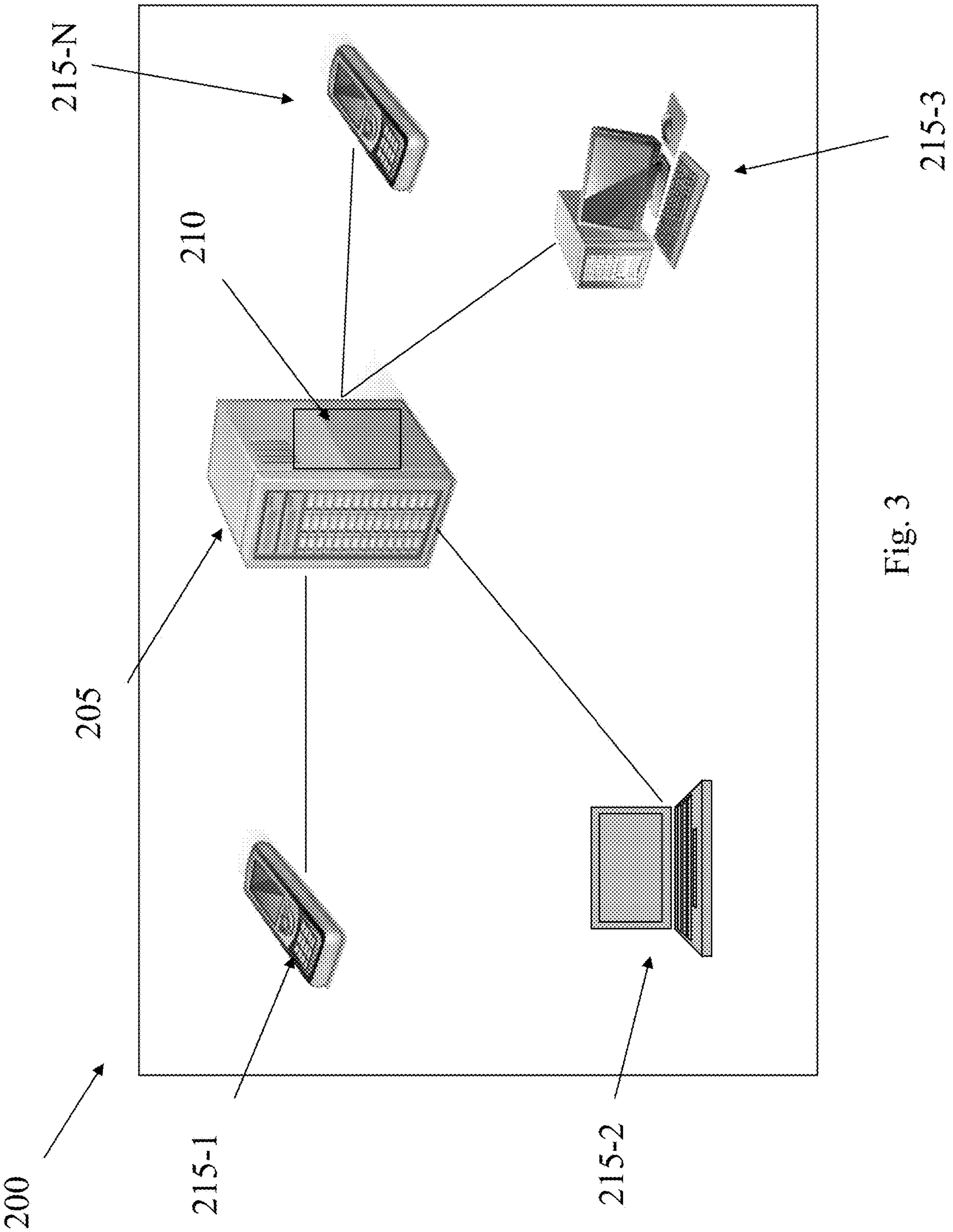
FIG. 3 illustrates an exemplary gaming machine of the type that may be used to facilitate the embodiments of the present invention.

FIG. 3 shows a block diagram of a wireless system 200 which may be used to facilitate remote play of the game according to the embodiments of the present invention. The wireless network system 200 comprises a processor-equipped game server 205, including one or more processors 210 running game software, and remote devices 215-1 through 215-N (e.g., smart phones) configured to access said game server 205 facilitating game play on the remote devices 215-1 through 215-N. In another embodiment, the video game according to the embodiments of the present invention may be in the form of a software application ("App") downloadable onto smart phones, tablets or computers and playable via processing power and a user interface associated therewith.

In one embodiment of the present invention, a plurality of gaming devices are connected to one or more servers over a network, such as a wide area network (WAN) and/or a local area network (LAN). In one embodiment, the gaming devices are electronic gaming machines, otherwise known as "slot machines." These may be classified as Class II, Class III, video lottery terminals (VLT), or the like. Electronic gaming machines may present either one or a plurality of games to the player such as video reels, video poker, video keno, video bingo, electronic table games, and the like. In another embodiment, the gaming devices are gaming kiosks or terminals. Alternatively, the gaming devices may include remote gaming devices, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a slot game to be played on a gaming device, the gaming device uses the randomization device to select the symbols which land on each space of the primary game reel matrix. In another embodiment, at least some aspects of the game are provided by one or more servers, such as a local server, a wide area server, a local area progressive server (LAP), or a wide area progressive server (WAP). The server or servers may include a randomization device for randomly selecting the symbols.

In the example of mechanical, electromechanical, or video reel machines, the games may include a number of mechanical or simulated rotating reels that are arranged in a horizontal configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

As the player plays the games, the gaming device and/or a server or another computing device tracks data representative of the gameplay of the player (referred to herein as "gameplay data"), such as theoretical win/loss, a past history, wager amounts, a number of plays per hour, wager amounts relative to an amount of time spent playing games on the gaming device, a number of wins or losses of the player, a cumulative amount wagered by the player, an amount of money won or lost by the player, and/or any other suitable data. The gameplay data is used to determine whether the player is eligible to receive a comp. The comp may include, for example, one or more free beverages, free meals, free tickets, reduced price meals or tickets, and/or the like.

Figure 4:
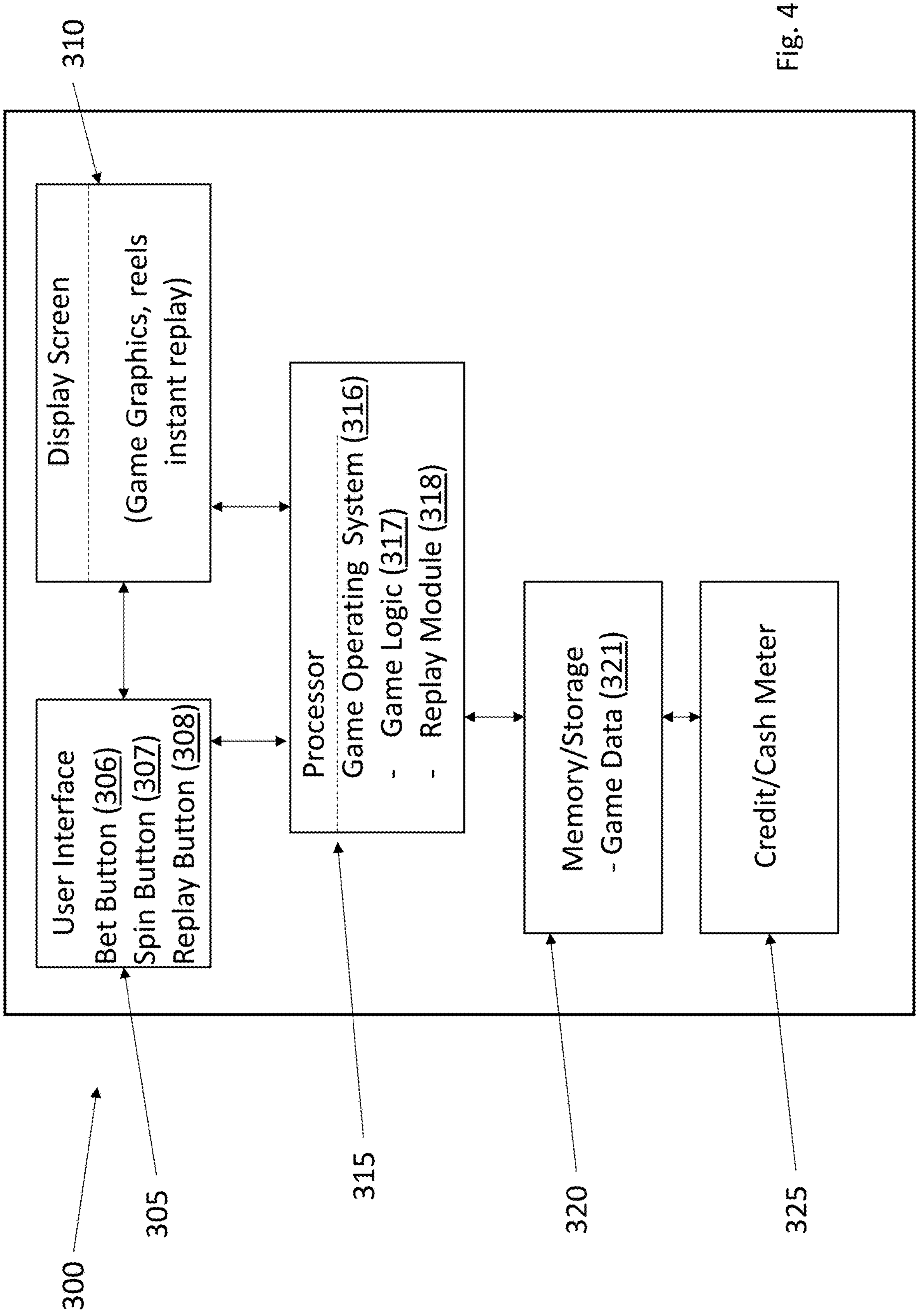
FIG. 4 illustrates a block diagram of an EGM incorporating the replay system according to the embodiments of the present invention.

FIG. 4 illustrates a block diagram 300 of an EGM incorporating the replay system according to the embodiments of the present invention. The EGM 300 as shown in FIG. 4 includes a user interface 305 having a bet button 306, spin button 307 and replay button 308, game display 310, processor 315 running a game operating system 316, game logic 317, replay module 318 and memory 320 including game data 321 and credit/cash meter 325.

In one embodiment, the instant replay module is integrated directly into the game operating system (OS) 316 that governs the operation of the EGM 300. The game OS 316 administers all game logic, graphical rendering, outcome determination, and player interaction, and is adapted to support the capture, storage, and playback of game round data for instant replay functionality.

During standard game execution, the game OS 316 records relevant events-including spin initiation, symbol stops, bonus rounds, and audiovisual outputs-into memory. Upon conclusion of a game round, copies of the game event log and graphical outputs are tagged for storage by the instant replay subsystem, which may reside as a module, process, or service within the OS architecture. The replays may be stored temporarily until shown to the player after which the replays are deleted, or the replays may be stored long term for later access by the player via a player slot club account file or other database means.

In another embodiment, the instant replay captures a re-enactment or play creation when initiated rather than "upon conclusion" of the original game play. In such an embodiment, the "replay" data is stored or created until after the feature has been initiated. This embodiment can eliminate lag time that can be associated with replays stored in advance of the time when the player initiates the feature. Therefore, in one embodiment, metadata may be used to re-create a replay without the video, sound, etc., residing on a storage medium for selection.

Figure 6:
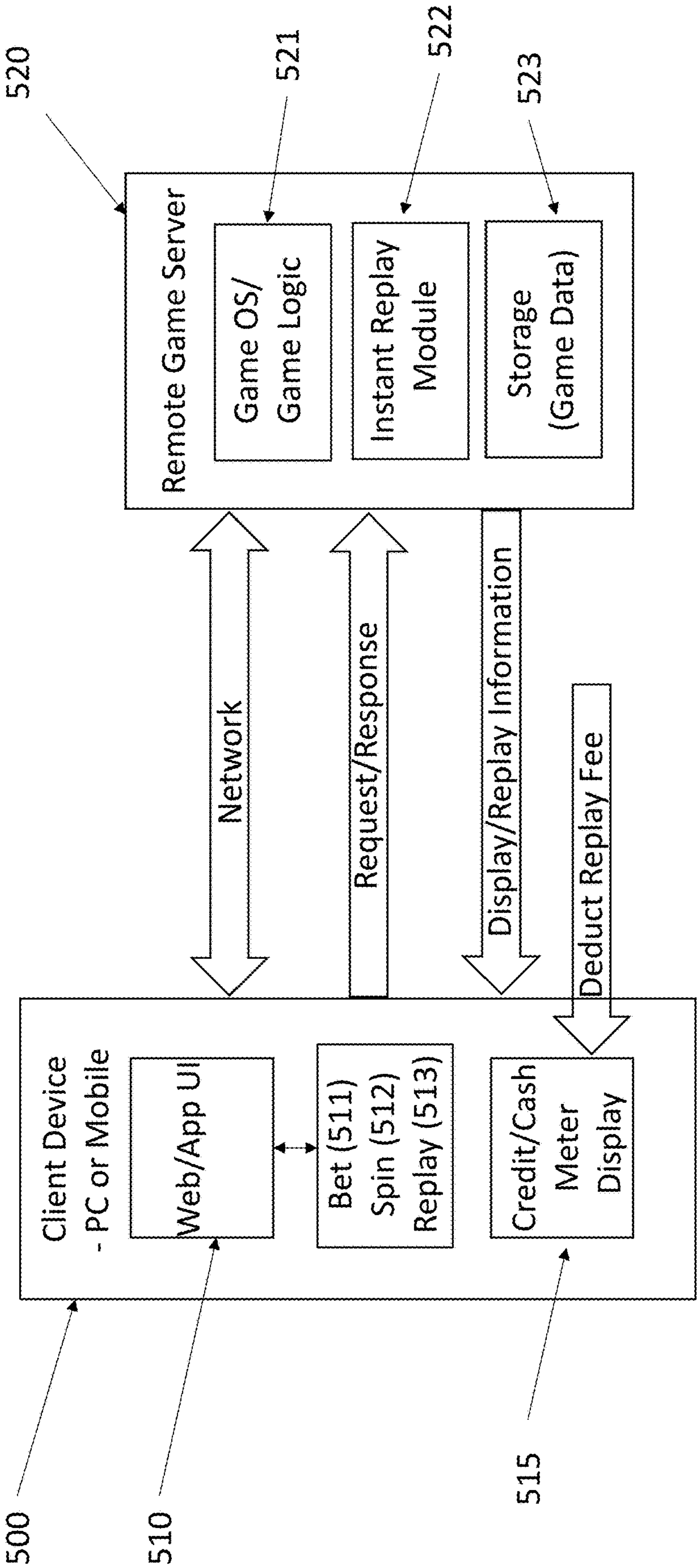
FIG. 6 illustrates a schematic diagram of a network-based (online/virtual) slot system incorporating the replay system according to the embodiments of the present invention.

In another embodiment, the replay module 318 runs separately and is in communication with the processor 318 and memory 320. The replay module 318 may also be installed as an aftermarket system. As shown in FIG. 6, in an online embodiment, a processor on a remote server runs a replay module. If an online game is downloaded to a mobile device, the mobile device may run the replay module.

The replay button 308 is but one input device that can be used to trigger the replay of the previous game play. Alternatively, the game display may be touch screen with a replay icon which, when touched, triggers the replay feature. Other mechanical devices (e.g., switches toggles, etc.) can be incorporated on the EGM's button panel for the purpose of triggering the replay feature.

In one embodiment, the replay module 318 is configured to prompt the player to replay the previous game play. For example, the replay module 318 may be configured to prompt the player, responsive to any win (>$1200) requiring a hand pay by the casino. Alternatively, the replay module 318 may prompt the player based on the strength of the outcome (e.g., 4 Aces or better) rather than the win amount. Those skilled in the art will recognize that the replay module 318 may prompt the player based on any parameter or parameters desired by the operator.

Figure 5:
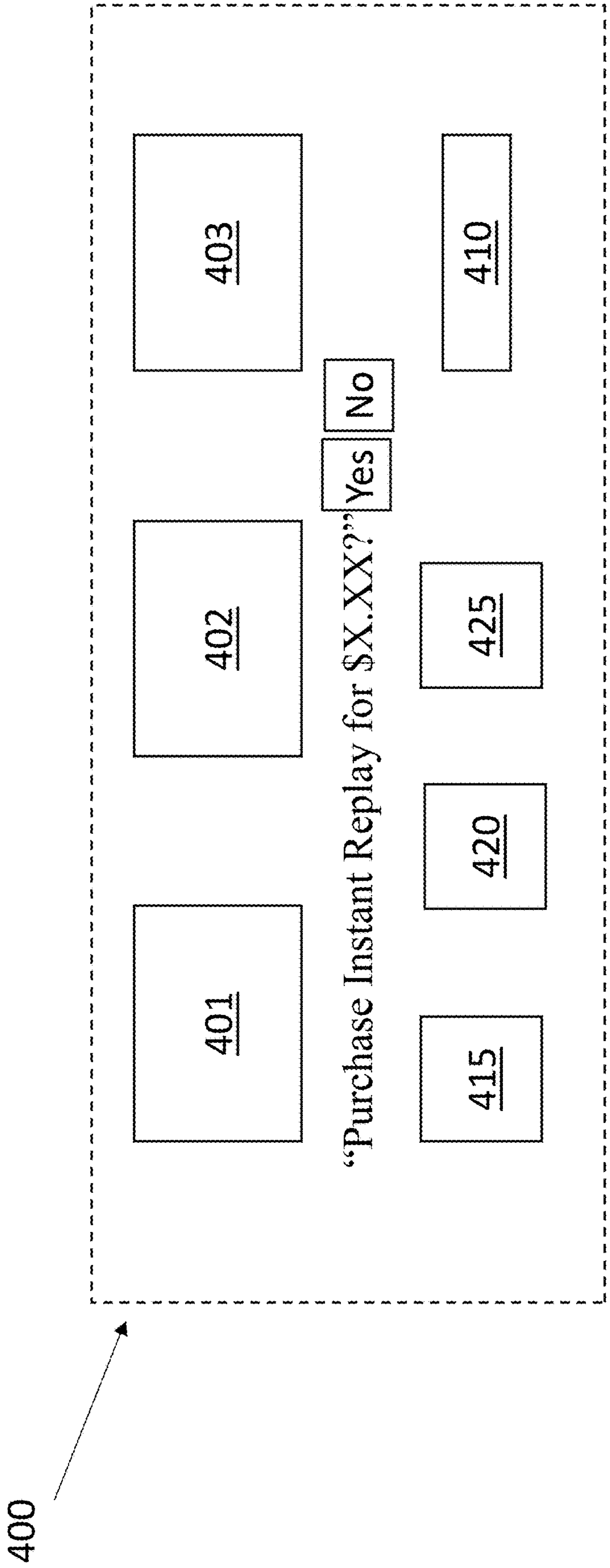
FIG. 5 illustrates a front view of an exemplary user interface for an EGM or virtual machine with a replay button and purchase prompt according to the embodiments of the present invention.

FIG. 5 shows a front view of an exemplary user interface 400 for an EGM or virtual machine with a replay button and purchase prompt according to the embodiments of the present invention. As shown, the user interface 400 is a display presenting three slot reels 401, 402 and 403. The reels 401, 402 and 403 can be video reels or physical reels. The display also shows game animation and credit meter 410. A button deck proximate to the display houses a bet button 415, spin button 420 and replay button 425. Like the reels 401, 402 and 403, the buttons 415, 420 and 425 can be video buttons or physical buttons. Those skilled in the art will recognize that the number of reels may exceed three and be in the form of a matrix of reels with different pay lines.

In one embodiment, where the instant replay is offered as an optional, purchasable service, after the game round concludes and before the replay is displayed, the game OS 316 prompts the player through the user interface with the option to purchase the instant replay. The prompt may be, for example, a dialog window, pop-up, or overlay, which may detail the cost and payment method.

As shown in FIG. 5, the EGM may display a player prompt such as "Purchase Instant Replay for $X.XX?" in conjunction with "Yes or No" input icon. If the player selects the "Yes" input, the replay fee is deducted from the credit meter 410. In one embodiment, the player may turn the replay module off so that the prompts stop. In another embodiment, the player may select when the prompt is displayed. For example, a player may want to replay any hands that are stronger than a flush or any hands that pay out over $100. In such an embodiment, the user interface of the EGM allows the player to customize the prompt and replay module with limits, if any, configured by the operator. In such a customizable system, the replay module may be separate from the game OS.

The deduction transaction is securely recorded by the system, and the player's displayed balance is updated by the game OS 316 prior to enabling the instant replay function. This process provides intuitive integration for the player and operator within the payment/accounting systems already maintained by the EGM or platform.

The purchase prompt may be configured for presentation after every round, only after certain outcomes (for example, near wins or large wins), or according to other operator-selectable criteria. Audit logs can record each prompt and purchase (or non-purchase) for regulatory and analytical purposes.

In one embodiment, the EGM may prompt the player to play/stream the replay on the player's mobile device. In such an embodiment, Bluetooth, NFC or other short range wireless technology links the mobile device and EGM and permits the replay to be transmitted to the mobile device. In such an embodiment, the player may then store the replay on the mobile device for later viewing.

FIG. 6 shows a schematic diagram 500 of a network-based (online/virtual) gaming system incorporating the replay feature according to the embodiments of the present invention. A client device 510 may be a personal computer or mobile device. The client device 510 includes a user interface 511 for operating a bet input 512, spin input 513 and replay input 514. The client device 510 also includes a credit meter 515. Via a wireless network, the client device 510 communicates with a remote server 520 running a game operating system and game logic 521, instant replay module 522 and storage 523 including game data.

The user interface 511 permits communication with the remote server 520 for purposes of betting and requesting a game play replay via the instant replay module 522. Upon receiving the replay request, the remote server 520 activates the instant replay module 522 which retrieves the replay from storage 523 and transmits it to the client device 510 for play back. If the replay requires payment (e.g., 25¢), the funds are deducted from the credit meter 515.

Figure 7:
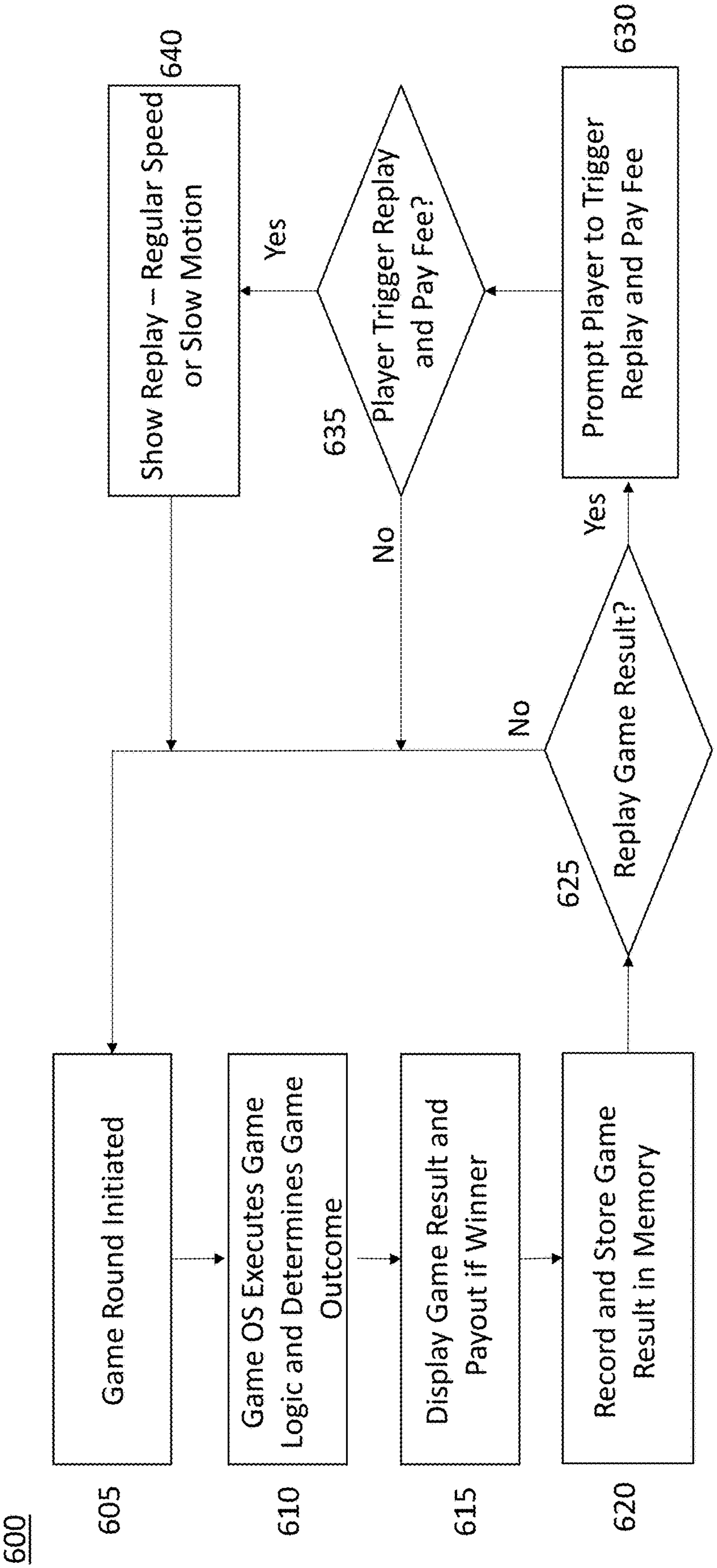
FIG. 7 illustrates a flow chart detailing the methodology of the replay system according to the embodiments of the present invention.

Now referring to FIG. 7, a flow chart 600 details one methodology for implementing the replay feature according to the embodiments of the present invention. At step 605, a game play is initiated by the player. The game play is often initiated by pushing a SPIN or PLAY button (physical or video-based) which also deducts the wager from the credit meter. At step 610, the game OS plays the game and determines the outcome. At step 615, the results are displayed, and any winnings are paid into the credit meter. At step 620, the game result in recorded in temporary memory/storage. At step 625, the system determines if the game result triggers the replay option. If not, the flow chart 600 loops back to step 605 for the next game play. If, at step 625, the replay option is triggered, at step 630, the player is prompted to pay for the replay. The player may also have the option to select the speed of the replay. At step 635, the system determines if the player paid for the replay or declined to do so. If the player declines, the flow chart 600 returns to step 605 for the next game play. If, at step 635, the player pays the fee for the replay, at step 640 the replay is played on the EGM and/or transmitted to the player's mobile device.

In one embodiment, the replay of the actual game play, like a video capture, or a re-enactment of the game played, is regenerated and re-run when recalled from the replay system and not necessarily identical to the actual outcome as originally displayed. This embodiment is useful for at least gaming systems configured to complete game plays instantly (e.g., display the final game outcome with no animations, sounds, etc. aka 'turbo mode'). In one embodiment, the replay system generates simulated replays (or wholly created game plays) for games played in this manner at normal speeds as well as slowed down to show reels spinning, keno draws, card flips etc. when none was ever actually displayed to the player during the game play.

The system and method detailed herein may be adapted to replay bonus rounds in addition to primary game play. For example, with a Wheel of Fortune® EGM, a spin of the bonus wheel may be replayed based on the result and replay module setting.

In one embodiment, the system may store all eligible replays in memory/storage until a player presses cashout at which time the system prompts the player to purchase one or more stored replays.

The system and method detailed herein also log all replay events and purchasers for regulatory and/or analytical purposes. The logs may be maintained as long as required by all regulatory agencies. In one embodiment, the system is configured to maintain a history buffer to store multiple past results.

Those skilled in the art will recognize that the fee-based system may necessitate a novel accounting methodology. In one such methodology, a separate accounting instance meter along with the $X.XX meter for recording how often the replay feature is used and how much revenue it generates. Standard communications can be used to retrieve the information.

We claim:

1. A gaming system comprising:

a monetary input device configured to receive a physical item associated with a monetary value;

a user interface configured to:

enable a player to select a wager for a game of chance and enable the player to initiate a cash out operation;

at least one processor running executable instructions related to a game of chance;

said at least one processor programmed to:

add said monetary value to a credit balance for said player;

deduct said selected wager from said credit balance; and decrease said credit balance in response to said cash out operation;

at least one game display;

memory in communication with said at least one processor; and wherein said at least one processor runs said executable instructions to: (i) generate and present on said at least one game display, random primary game plays and outcomes; (ii) store a most recent random primary game play and outcome meeting pre-established criteria; (iii) prompt a player to replay said most recent random primary game play and outcome; and (iv) responsive to a player accepting said prompt, replay said most recent random primary game play and outcome on said at least one game display in slower motion than said most recent primary game play and outcome was originally played.

2. The gaming system of claim 1 wherein said at least one processor further runs said executable instructions to: receive a payment prior to: (iv) replay said last random primary game play and outcome on said at least one game display.

3. The gaming system of claim 2 wherein said at least one processor further runs said executable instructions to: collect said payment from a credit meter.

4. The gaming system of claim 1 wherein said at least one processor further runs said executable instructions to: (i) generate and present on said at least one game display, random bonus game plays and outcomes; (ii) store a most recent random bonus game play and outcome meeting pre-established criteria; (iii) prompt a player to replay said most recent random bonus game play and outcome; and (iv) replay said most recent random bonus game play and outcome on said at least one game display.

5. The gaming system of claim 1 wherein said pre-established criteria is based on (i) a winning amount associated with said most recent game play and outcome or (ii) a strength of said most recent game play and outcome.

6. The gaming system of claim 1 wherein said at least one processor further runs said executable instructions to: maintain a history buffer for multiple past game plays and outcomes.

7. The gaming system of claim 1 wherein said at least one processor further runs said executable instructions to: store all replays until a cashout event.

8. A gaming system comprising:

a user interface configured to:

enable a player to select a wager for a game of chance; and play said game of chance on a display;

at least one processor running executable instructions related to said game of chance;

memory in communication with said at least one processor; and wherein said at least one processor runs said executable instructions to: (i) generate and present on said display, random primary game plays and outcomes; (ii) store a most recent random primary game play and outcome meeting pre-established criteria; (iii) prompt a player to replay said most recent random primary game play and outcome; and (iv) responsive to a player accepting said prompt, replay said most recent random primary game play and outcome on said at least one game display in slower motion than said most recent primary game play and outcome was originally played.

9. The gaming system of claim 8 wherein said at least one processor further runs said executable instructions to: receive a payment prior to: (iv) replay said last random primary game play and outcome on said at least one game display.

10. The gaming system of claim 9 wherein said at least one processor further runs said executable instructions to: collect said payment from a credit meter.

11. The gaming system of claim 8 wherein said at least one processor further runs said executable instructions to: (i) generate and present on said at least one game display, random bonus game plays and outcomes; (ii) store a most recent random bonus game play and outcome meeting pre-established criteria; (iii) prompt a player to replay said most recent random bonus game play and outcome; and (iv) replay said most recent random bonus game play and outcome on said at least one game display.

12. The gaming system of claim 8 wherein said pre-established criteria is based on (i) a winning amount associated with said most recent game play and outcome or (ii) a strength of said most recent game play and outcome.

13. The gaming system of claim 8 wherein said at least one processor further runs said executable instructions to: maintain a history buffer for multiple past game plays and outcomes.

14. The gaming system of claim 8 wherein said at least one processor further runs said executable instructions to: store all replays until a cashout event.

15. A gaming system comprising:

a monetary input device configured to receive a physical item associated with a monetary value;

a wireless communication device;

a user interface configured to:

enable a player to select a wager for a game of chance and enable the player to initiate a cash out operation;

at least one processor running executable instructions related to a game of chance;

said at least one processor programmed to:

add said monetary value to a credit balance for said player;

deduct said selected wager from said credit balance; and decrease said credit balance in response to said cash out operation;

at least one game display;

memory in communication with said at least one processor; and wherein said at least one processor runs said executable instructions to: (i) generate and present on said at least one game display, random primary game plays and outcomes; (ii) store a most recent random primary game play and outcome meeting pre-established criteria; (iii) prompt a player to replay said most recent random primary game play and outcome; and (iv) responsive to a player accepting said prompt, transmit a replay of said most recent random primary game play and outcome, via said wireless communication device, to a mobile device for play in slower motion than said most recent primary game play and outcome was originally played.

16. The gaming system of claim 15 wherein said at least one processor further runs said executable instructions to: receive a payment prior to: (iv) replay said last random primary game play and outcome on said at least one game display.

17. The gaming system of claim 16 wherein said at least one processor further runs said executable instructions to: collect said payment from a credit meter.

18. The gaming system of claim 15 wherein said at least one processor further runs said executable instructions to: (i) generate and present on said at least one game display, random bonus game plays and outcomes; (ii) store a most recent random bonus game play and outcome meeting pre-established criteria; (iii) prompt a player to replay said most recent random bonus game play and outcome; and (iv) replay said most recent random bonus game play and outcome, via said wireless communication device, to said mobile device.

19. The gaming system of claim 15 wherein said pre-established criteria is based on (i) a winning amount associated with said most recent game play and outcome or (ii) a strength of said most recent game play and outcome.

20. The gaming system of claim 15 wherein said at least one processor further runs said executable instructions to: maintain a history buffer for multiple past game plays and outcomes.

21. The gaming system of claim 15 wherein said at least one processor further runs said executable instructions to: store all replays until a cashout event.

22. A gaming system comprising:

a user interface configured to:

enable a player to select a wager for a game of chance; and play said game of chance on a display;

at least one processor running executable instructions related to said game of chance;

memory in communication with said at least one processor; and wherein said at least one processor runs said executable instructions to: (i) generate and present on said display at least a random primary game outcome; (ii) prompt a player to replay a most recent random primary game play having an outcome; (iii) responsive to a player accepting the prompt, generate and play on said display a simulation of said most recent random primary game play and outcome.

23. The gaming system of claim 22 wherein said simulated replay is generated based on metadata.

24. The gaming system of claim 22 wherein said simulated replay is generated and shown when no primary game play is displayed.

* * * * *